(12) United States Patent
Sims et al.

(10) Patent No.: US 10,970,314 B2
(45) Date of Patent: Apr. 6, 2021

(54) CONTENT DISCOVERY SYSTEMS AND METHODS

(71) Applicants: ATLASSIAN PTY LTD, Sydney (AU); ATLASSIAN, INC., San Francisco, CA (US)

(72) Inventors: Geoff Sims, Sydney (AU); Michael Fulthorp, Sydney (AU); Mike Ortman, San Francisco, CA (US); Jeff Nelson, Sydney (AU); Matthew Hunter, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 194 days.

(21) Appl. No.: 16/370,776

(22) Filed: Mar. 29, 2019

(65) Prior Publication Data
US 2020/0201941 A1    Jun. 25, 2020

Related U.S. Application Data

(60) Provisional application No. 62/783,827, filed on Dec. 21, 2018.

(51) Int. Cl.
| | |
|---|---|
| G10L 15/16 | (2006.01) |
| G06F 17/16 | (2006.01) |
| G06F 17/27 | (2006.01) |
| G06F 16/28 | (2019.01) |
| H04L 12/24 | (2006.01) |
| G06F 40/30 | (2020.01) |
| G06F 16/93 | (2019.01) |
| G06F 16/33 | (2019.01) |
| G06F 40/12 | (2020.01) |
| G06F 40/284 | (2020.01) |

(52) U.S. Cl.
CPC ........ *G06F 16/285* (2019.01); *G06F 16/3347* (2019.01); *G06F 16/93* (2019.01); *G06F 40/12* (2020.01); *G06F 40/30* (2020.01); *H04L 41/5074* (2013.01); *G06F 40/284* (2020.01)

(58) Field of Classification Search
CPC ......... G10L 15/16; G06F 17/16; G06F 17/27; G06F 17/30
See application file for complete search history.

(56) References Cited

U.S. PATENT DOCUMENTS

| | | | | |
|---|---|---|---|---|
| 6,766,287 B1 * | 7/2004 | Kupiec | ................. | G06F 40/253 704/9 |
| 6,775,677 B1 * | 8/2004 | Ando | .................. | G06F 16/3347 707/739 |
| 9,852,337 B1 * | 12/2017 | van Rotterdam | ....... | G06F 16/93 |

(Continued)

*Primary Examiner* — Shreyans A Patel
(74) *Attorney, Agent, or Firm* — Brownstein Hyatt Farber Schreck, LLP

(57) ABSTRACT

Described herein is a computer implemented method comprising accessing a document, generating a document vector in respect of the document, and generating a sentence vector for each sentence in the document. The method further comprises calculating a sentence similarity score for each sentence in the document which, for a given sentence, is calculated based on a similarity between the sentence vector for the given sentence and the document vector, and identifying one or more representative document sentences for inclusion in a document summary.

20 Claims, 5 Drawing Sheets

(56) References Cited

U.S. PATENT DOCUMENTS

| | | | | |
|---|---|---|---|---|
| 2005/0096897 A1* | 5/2005 | Ando | ............... | G06F 40/289 |
| | | | | 704/4 |
| 2014/0365410 A1* | 12/2014 | Gallant | ............... | G06N 5/04 |
| | | | | 706/12 |
| 2019/0066663 A1* | 2/2019 | Kotri | ............... | G06N 3/08 |
| 2019/0221204 A1* | 7/2019 | Zhang | ............... | G06F 16/93 |
| 2020/0201941 A1* | 6/2020 | Sims | ............... | G06F 16/285 |

* cited by examiner

CONTENT DISCOVERY SYSTEMS AND METHODS

BENEFIT CLAIM

This application claims the benefit under 35 U.S.C. 119(e) of provisional application 62/783,827, filed Dec. 21, 2018, the entire contents of which are hereby incorporated by reference as if fully set forth herein.

TECHNICAL FIELD

The present disclosure is directed to content discovery systems and methods.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Over time, organizations and their employees build up vast amounts of content in digital form. The management of such content presents a number of difficult and well known problems, including how to facilitate effective and efficient searching for/discovery of relevant content, how to surface relevant content to the right person at the right time, and generally how to leverage the available content to improve operational efficiency.

SUMMARY

The appended claims may serve as a summary of the invention.

Figure 1:
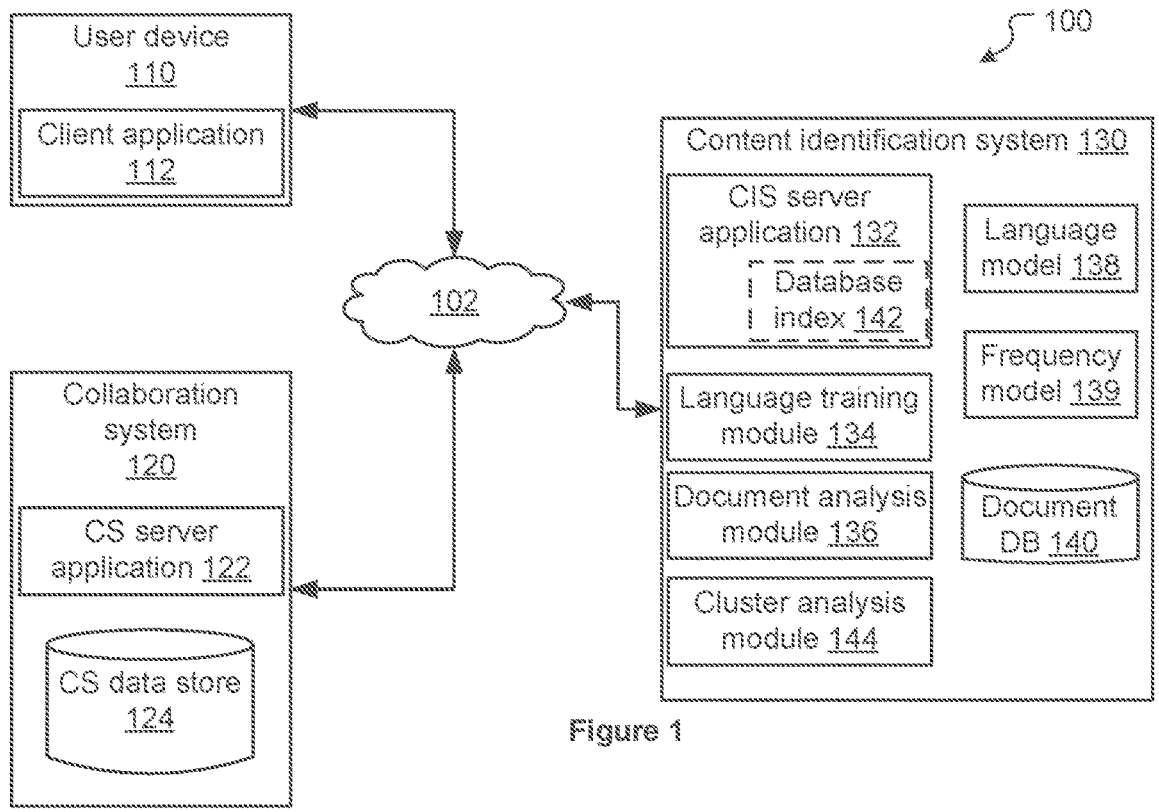
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure describes systems and methods for identifying documents that relate to an input query.

As used herein, a document is any digital object storing information. Typically, the information will be textual information, however alternative forms are possible, for example images, audio data (which can typically be processed to recognize text), or other content.

By way of non-limiting illustration, examples of documents include: web pages; word processor documents; pdf documents; presentations; instant messaging system dialogues (and/or individual messages forming part thereof); discussion forum dialogues (and/or individual contributions forming part thereof); issue tracking system tickets (e.g. support requests, bug reports, any other work item tracked/maintained by an issue tracking system).

In addition to information, a document also has or is associated with document metadata. The type of metadata included in/associated with a document will depend on the type of document. Common examples of metadata, however, include: document title; document type; document creator; document creation time; document access details (e.g. time(s) of document access and/or identifiers of accessing users); document permissions (e.g. whether individual users/user types/user groups can read and/or edit the document); document status.

Documents may be created using, stored by, and accessed through various systems. For example: web pages may be created/stored/accessed through a wiki system such as Confluence; tickets may be created/stored/accessed through an issue tracking system such as Jira; instant message system dialogues may be created/stored/accessed through an instant message system such as Slack or Stride. Furthermore, documents created by one system/program may well be stored by another. For example, word processor, pdf, presentation, html and other documents may be created by various programs (for example the Microsoft suite of productivity programs) and stored/accessed through another system—e.g. a document/content storage or management system.

As used herein, the term collaboration system will refer to a system that provides at least document storage and access functionality. Many collaboration systems will also provide additional functionality, for example, document creation, editing, sharing, etc., however this is not necessary.

Environment Overview

FIG. 1 illustrates an example environment 100 in which embodiments and features of the present disclosure are implemented.

Example environment 100 includes a communications network 102 which interconnects end user devices (one such device, user device 110, illustrated), one or more collaboration systems (one such system 120 illustrated), and a content identification system 130. For ease of reference, the acronym CS will at times be used in place of collaboration system, and the acronym CIS used in place of content identification system.

User devices

While environment 100 depicts a single user device 110 any implementation of the present disclosure will typically involve multiple user devices 110 (operated by multiple users) interacting with one or more collaboration systems (e.g. CS 120) and/or the CIS 130.

A given user device 110 is a computer processing system operated by an end user to perform various tasks including accessing collaboration systems (such as CS 120) and the CIS 130. In the illustrated embodiment, user device 110 has a client application 112 installed thereon. User device 110 will also have other applications installed/running thereon, for example an operating system.

When executed by the user device 110 (e.g. by a processor such as processor 204 described below), the client application 112 configures the user device 110 to provide client-side functionality to one or more server applications—for example CS server application 122 and/or CIS server application 132. Generally speaking, client-side functionality involves presentation of a user interface on a display (such as display 212 discussed below), receiving user input via the user interface and input devices (such as input device 214 discussed below), and communicating data to/receiving data from (using a communication interface such as 218 described below) a server application (e.g. CS server application 122 and/or CIS server application 132) operating on a server system (e.g. CIS 130 or CS 120). Client-side functionality may also involve some data processing, though typically actual data processing can be performed by either the client application 112 or a corresponding server application.

Client application 112 may be a dedicated application client that communicates with one or more application server applications using a defined API. Alternatively, client application 112 may be a web browser (such as Chrome, Safari, Internet Explorer, Firefox, or an alternative web browser) which communicates with one or more web server applications using http/https protocols.

User device 110 may well have multiple client applications 112 installed thereon. For example, user device 110 could have a CIS client application for providing CIS client-side functionality, a separate issue tracking system client application for providing client-side functionality for an issue tracking system server (one type of CS 120), a separate wiki system an client application for providing client-side functionality for a wiki system server (another type of CS 120), and a separate instant messaging system client application for providing client-side functionality for an instant messaging system server (a further type of CS 120). Alternatively, a single client application 112 could provide client-side functionality for all of these server systems.

User device 110 may be any form of computing device. Typically, user device 110 will be a personal computing device—e.g. a desktop computer, laptop computer, tablet computer, mobile phone, or other personal computing device.

Collaboration Systems

While environment 100 depicts a single CS 120 the features described herein may (as will become apparent from the below description) involve a number of different CSs.

As noted above, a given collaboration system provides at least document storage and access functionality. Examples of collaboration systems that could be included in environment 100 include: wiki systems (e.g. Confluence, Sharepoint); issue tracking systems (e.g. Jira, Jira Service Desk, Trello, Bugzilla); instant messaging systems (e.g. Stride, Slack); document/content storage systems (E.g. DropBox, Box, OneDrive).

By way of simple example, CS 120 as illustrated includes a CS server application 122 and a CS data store 124.

The CS server application 122 configures the CS 120 to provide server-side collaboration system functionality: e.g. receiving and responding to corresponding client application requests (e.g. requests from client application 112). The CS server application 122 may be a web server (for interacting with web browser clients) or an application server (for interacting with dedicated application clients). While illustrated with a single collaboration system server application 122, CS 120 may run multiple server applications (e.g. one or more web servers and/or one or more application servers). In the presently illustrated embodiment, the CS server 122 also receives and responds to queries from the CIS 130, and at time generates and communicates queries to the CIS 130 and receives responses to those queries from the CIS 130.

CS data store 124 stores documents, document metadata, and any other data involved in the operation of the CS 120 (for example, user account data, access/permission data, etc.). The CS data store 124 may run on the same physical computer system as the collaboration system server application 122, or may run on its own dedicated computer system (accessible to collaboration system server application(s) 122 either directly or via a communications network). CS data store 124 may include a database system, a shared file system, and/or any other data storage system facilitating the storage and retrieval of data.

The particular components/devices included in a given collaboration system 120 will vary significantly depending on the type of collaboration system and its installation. For example, a given CS may be a cloud hosted system or an on-site hosted system. Further, a CS designs for use by a small number of users may have a single collaboration system server application (running on a single server computer), while a larger scale system may provide multiple server applications running on multiple server computers. As a further example, a given collaboration system may be a scalable system including multiple distributed server nodes connected to one or more shared data stores (e.g. data store 124). Depending on demand from clients (and/or other performance requirements), collaboration system server nodes can be provisioned/de-provisioned on demand to increase/decrease the number of servers offered by the collaboration system server 120. Each collaboration system server 122 may run on a separate computer system and include one or more application programs, libraries, APIs or other software that implement server-side functionality.

The collaboration system server application 122 (running on collaboration system 120) and collaboration system client application 112 (running on user device 110) operate together to provide collaboration system functionality.

Content Identification System 130

The illustrated CIS 130 includes a CIS server application 132, a language training module 134, a document analysis module 136, a language model 138, a frequency model 139, and a document database 140.

The CIS server application 132 configures the CIS 132 to provide server-side content identification system functionality. As described further below, this generally involves communicating with collaboration systems (such as CS 120) and user devices (such as user device 110) and performing the CIS processing described herein. The CIS server application 132 may be a web server (for interacting with web browser clients) or an application server (for interacting with dedicated application clients). While illustrated with a single CIS server application 132, CIS 130 may run multiple server applications (e.g. one or more web servers and/or one or more application servers).

As described in further detail below, the language training module 134 generally performs operations involved in creating a language model 138 and frequency model 139. The language and frequency models 138 and 139 may be stored in any appropriate database or file system accessible to the CIS 130.

As described in further detail below, the document analysis module 136 generally performs operations involved in analyzing documents to create numerical representations thereof. The document analysis module 136 operates to maintain (e.g. populate) a document database 140 with records of documents known/accessible to the CIS 130. The document analysis module 136 also operates to analyze new documents (or, more generally, textual input) to create numerical representations thereof which are compared against the records in the document database 140 to determine similarity or otherwise.

Document database 140 may run on the same physical computer system as other components of the CIS 130, or may run on its own dedicated computer system (accessible to CIS components either directly or via a communications network). Document database 140 may include a database system, a shared file system, and/or any other data storage system facilitating the storage and retrieval of data.

In addition to the document database 140, CIS 130 generates and maintains an in-memory database index 142. Database index is an in-memory index of the document database 140 that is accessible to/stored in the CIS server application 132 and is used for queries to improve query response time.

While illustrated as separate modules, the functionality of the language training module 134 and/or document analysis module 136 may be integrated with the CIS server application 132, either as an integral part thereof or as an addon/integration.

Hardware Overview

The embodiments and features described herein are implemented by one or more special-purpose computing systems or devices. For example, in environment 100 each of the user device 110, CS 120, and CIS 130 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
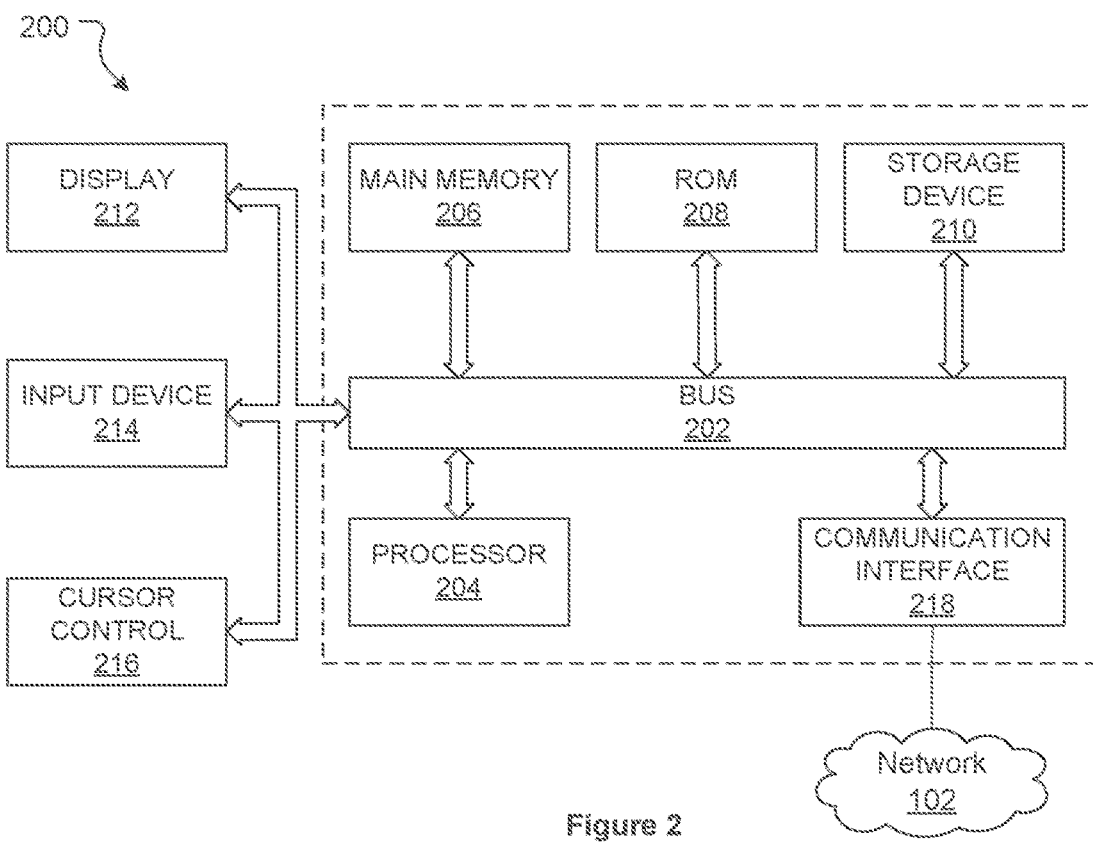
FIG. 2 is a block diagram of a computing system which his configurable to implement various embodiments and features of the present disclosure.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as in a CS 120 or CIS 130), it will typically be provided with higher end hardware allowing it to process data, access memory, and perform network communications more rapidly than, for example, a user device (such as device 110) which will typically be a personal computer system such as a phone, tablet, laptop computer or desktop computer.

Model and Database Generation/Maintenance

As described above, the embodiments described herein provide systems and methods for identifying content. In order to do so, the CIS 130 creates and maintains a language model 138, a frequency model 139 and a document database 140.

In the present embodiment, the operations of the language model creation process 300 and the document database creation process 400 are respectively performed by the language training module 134 and the document analysis module 136 of the CIS 130. The operations could, however, be performed by alternative components of the CIS 130 (e.g. the CIS application server 132).

Language and Frequency Model Generation

Figure 3:
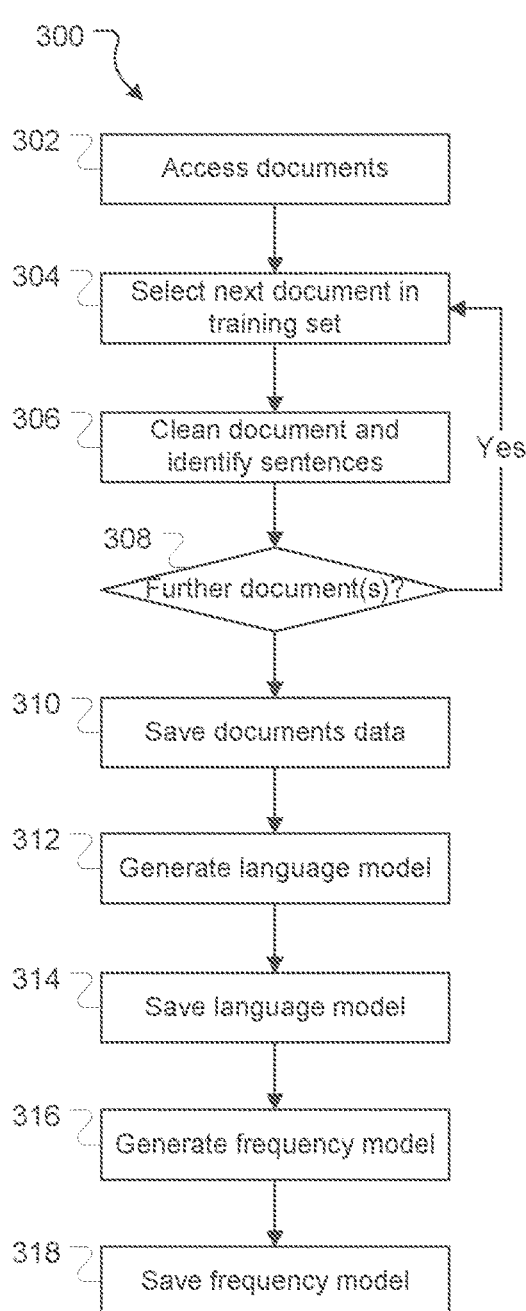
FIG. 3 is a flowchart indicating operations performed to generate language and frequency models.

Turning to FIG. 3, the language and frequency model generation process 300 will be described.

At 302 the language training module 134 accesses documents that are available for use in generating the language model.

In the present example, documents are accessed via communication with the relevant collaboration systems (e.g. CS 120). In certain cases documents and their metadata are taken as a whole from a CS 120. For example, in the case of a wiki collaboration system each separate web page (and associated metadata) is a separate document. In other cases, some additional processing may be required. For example, in the case of an issue tracking system, a document may relate to a ticket with the document content being the description of the ticket and the document metadata being various other information concerning the ticket (e.g. the ticket title, a ticket status, etc.).

Typically, the more documents that can be accessed the better the language model created by process 300 will be.

Depending on implementation, the documents accessed at 302 may be one or more of the following types of documents: tickets maintained by one or more issue tracking collaboration systems; web pages maintained by one or more wiki collaboration systems; instant message dialogues (or individual messages) maintained by one or more issue tracking collaboration systems; other documents maintained by other collaboration systems.

At 304 to 308, the language training module 134 processes each of the documents in the training set to identify and generate a set of sentences within the documents. Documents from the training set may be processed in any order, or in parallel.

At 304, the language training module 134 selects the next document in the training set.

At 306, the language training module 134 processes the document to clean it and identify sentences therein. Cleaning, for example, involves converting all text to lower case, removing common words (e.g. 'and', 'but', 'the', etc.) removing punctuation, and stemming words (e.g. converting words to their root form—for example 'swimming' →'swim'). In addition, certain parts of speech may be converted to a particular identifier—for example, all pronouns may be replaced with a "Pronoun" identifier. Various tools may be used for cleaning and parsing. In certain embodiments, the spaCy software library is used.

At 308, the language training module 134 determines whether there are any documents in the training set that have not yet been processed. If so, processing returns to 306 to select the next unprocessed document in the training set.

If, at 308, all documents in the training set have been processed, processing continues to 310.

At 310, the language training module 134 saves the various data in respect of the documents for future use. The documents data may be saved in any appropriate location (file store/disk) accessible to the CIS 130. In the present embodiment, the data saved from the documents includes the original document text (enabling retrieval thereof without having to re-access the document from the relevant collaboration system) and the document sentences as cleaned and parsed at 306 (enabling downstream processing to be performed without having to re-perform the processing of 306).

Any appropriate format may be used for storage of the documents data. For example, a database may be used to store: document identifiers in respect of each document; each document identifier associated with original document text; each document identifier further associated with one or more sentence identifiers identifying cleaned/parsed sentences in the document; each sentence identifier associated with one or more cleaned/parsed words identifying words in each sentence.

At 312, the language training module 134 processes the set of sentences generated from processing the documents at 306 to generate the language model. Generally speaking, generation of the language model involves processing the entire set of sentences multiple times to predict each word given its context. This process results in a vector being generated for each word. Various tools may be to perform this vectorization process. In certain embodiments, vectorization is performed using the Gensim toolkit with the output being a word2vec model.

The language model may be generated in any appropriate format. For example, a comma separated value file or the like may be used which allows a table-type structure to be maintained in which tokenized words and their corresponding vectors are stored.

At 314, the language model generated at 310 is saved.

At 316, the language training module 134 processes the set of sentences to generate a frequency model. In the present embodiment, this involves processing the set of sentences to calculate the number of times each word occurs in each document. This process results in frequency model which may be generated/stored in any appropriate format. For example, and as with the language model above, a comma separated value file or the like may be used which allows a table-type structure to be maintained in which each word, its corresponding frequency in each document, and its total frequency (i.e. the number of times the work occurs in all processed documents) is stored.

In certain embodiments, instead of storing separate language and frequency models, a single model may be generated/saved—for example a table (or similar structure) which each word, its associated vector, and its associated frequency.

At 318, the frequency model generated at 316 is saved. The language and frequency model generation creation process 300 then ends.

The language and frequency model generation process 300 can be repeated if desired. This may be done if, for example, the language and frequency models are originally created using a relatively smaller set of documents and over time a larger set of documents with which to create the model is obtained/made accessible. Recreating the language and frequency models may also be appropriate if, for example, a shift in the way language is used occurs. If the language and frequency models are recreated, however, any downstream processing/operations based on the language model must also be re-performed (for example, the document database must also be recreated).

Document Database Creation and Update

Figure 4:
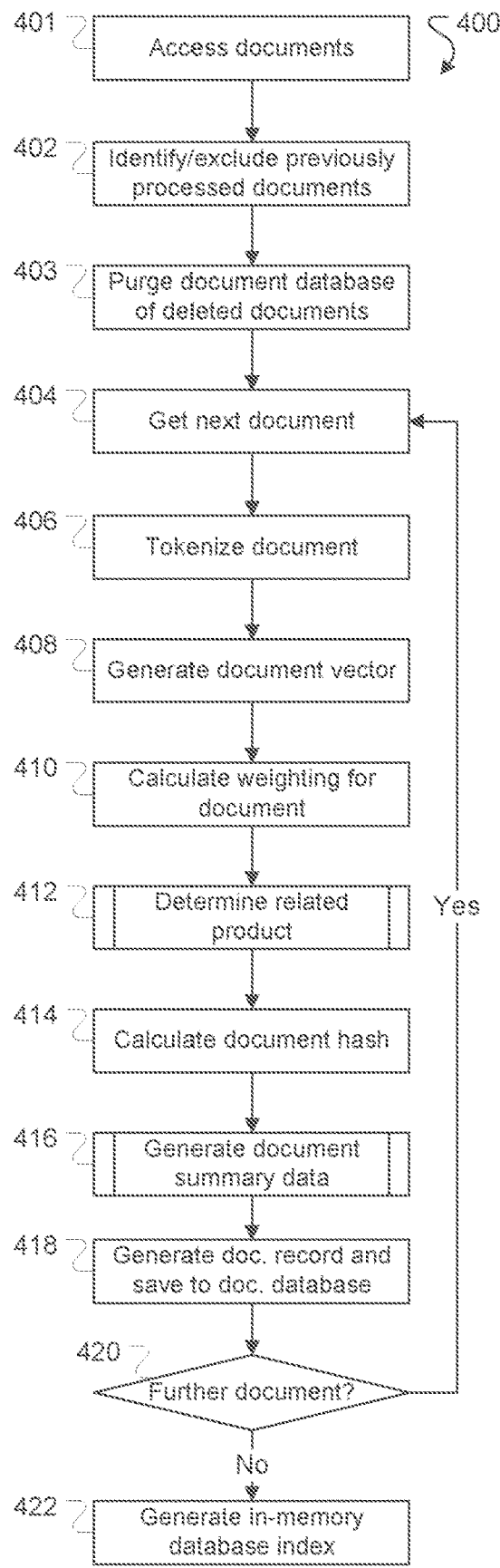
FIG. 4 is a flowchart indicating operations performed to generate a document database.

Turning to FIG. 4, the document database creation/update process 400 will be described. Process 400 is performed to initially create the document database 140. It is then subsequently performed to update the database 140 based on new and edited documents (and to account for deleted documents).

At 401, the document analysis module 136 accesses documents that are available to the CIS 130 for use in generating the document database. Initially (i.e. immediately after generating the language model as described above), the available documents will typically be the same as those accessed at 302 in the language/frequency model generation process. Over time, however, the number of documents that are available to be indexed in process 400 will increase (e.g. as the number of tickets/web pages/other documents maintained by the collaboration system(s) and accessible to the CIS 130 increases).

At 402 and 403 the document analysis module 136 determines whether the available documents include any previously processed documents and/or whether any previously processed documents are now absent from the available documents. During initial creation of the document database 140 all documents will be new and, accordingly, steps 402 and 403 can be omitted.

At 402, the document analysis module 136 identifies and excludes previously processed documents from the available documents accessed at 401. A previously processed document is one for which a document record exists in the document database and which has not changed since its existing document record was generated. Culling documents that are not new and that have not been changed since the previous database creation/update process prevents unnecessarily re-processing documents.

Identifying previously processed documents from the available documents can be performed in various ways. In certain embodiments, identifying previously processed documents is performed as follows. Initially, the document analysis module 136 identifies whether an available document has or does not have a corresponding record in the document database 140. This determination may be made based on any appropriate unique document identifier (for example, a combination of the document type and document identifier described in Table A below). If no corresponding record exists, the document is considered a new document and is not exclude from further processing. If a corresponding record does exist in the document database 140, a hash is computed in respect of the available document. Calculating the hash for the available document is the same process as described below at 414. The calculated hash for the available document is then compared against the hash in the corresponding document record. If the hash is the same, the document is considered an unedited existing document and is excluded from the available documents/precluded from further processing. If the hash is different, the document is considered to be an edited existing document and is not removed from the available documents.

At 403, the document analysis module 136 deletes records that relate to documents that that no longer exist from the document database 140. Generally speaking, this involves identifying any document records for which no corresponding available document was accessed at 401 (based again on a unique document identifier). Any document record that does not have a corresponding available document is deleted from the document database 140.

At 404, the document analysis module 136 selects the next document from the available documents that have not been excluded at 402.

At 406, the document analysis module 136 tokenizes the document selected at 404. This is similar to (or the same as) processing 306 of process 300, and results in document sentences and words being identified.

At 408, the document analysis module 136 generates a vector in respect of the document. In the present embodiment, generating a document vector involves taking each individual word in the document (identified in tokenization processing at 406), retrieving the word vectors for each word from the language model 138, and calculating the sum of those individual word vectors.

In certain embodiments, a weighted document vector is generated. This improves the ability to determine whether or not the document is relevant in downstream operations. A weighted document vector is generated by calculating weighted word vectors for each word in the document and summing those individual weighted word vectors. The weighting mechanism applied to each word vector retrieved from the language model 138 in order to generate a weighted word vector may be a term frequency-inverse document frequency (TF-IDF) weighting, calculated based on to the frequency of the word in the document divided by the frequency of the word as stored in the frequency model 139.

In certain embodiments, and in order to facilitate efficient processing in downstream operations, the document vector generated and at 408 is normalized. Normalizing the document vector involves normalizing each document vector to have a magnitude of 1.

Accordingly, and depending on implementation, the document vector generated at 408 may be: the sum of the individual word vectors; the normalized sum of the individual word vectors; the weighted sum of the individual word vectors; or the normalized sum of the individual word vectors.

At 410, the document analysis module 136 determines a weighting in respect of the document selected at 404.

Generally speaking, a document weighting provides a measure of the document's potential relevance that is based on the number of times the document has been linked in other documents that the CIS 130 has visibility of.

In the present embodiment, the number of times the document has been linked is based on data retrieved from a document linkage data structure that is maintained as part of an independent linkage identification process. Generally speaking, when the linkage identification process is run it accesses available documents from the collaboration systems and scrapes the relevant text thereof (e.g. comments, instant message posts, etc.) to identify where one document includes a link to another. When a document linkage is identified, the linkage identification process records this in the linkage data structure. Various linkage data structures may be used, however in the present embodiment the linkage data structure is a table-type format in which a record is created for each document link identified, each record including: a linking document identifier (i.e. the identifier of a document in which a link has been found); a linked document identifier (i.e. the identifier of the document has been linked); and a timestamp (the time at which the link was created).

In order to calculate the document weighting, the document analysis module 136 queries the document linkage data structure using the identifier of the current document to determine the number of times the current document has been linked.

In certain embodiments, the document weighting takes into account how recently or otherwise a linkage occurred, with more recent linkages being given a greater weight. Specifically, an exponential decay is used. In other words, the number of times the document has been referenced is counted, but an aged reference does not count as much as a more recent reference.

At 412, the document analysis module 136 attempts to identify one or more products to which the document relates. This process is described with reference to FIG. 5 below.

At 414, the document analysis module 136 calculates a hash value for the document. The purpose of the hash value is to facilitate identification of whether or not the document has been changed (at 402). Any appropriate hash function may be used for this purpose, provided the same has function is used consistently. In certain embodiments, the document hash is calculated based on the text of the document. The document hash may alternatively be based on a combination of the document text, document title, document location, document status, and related product(s).

At 416, the document analysis module 136 generates document summary data. This process is described with reference to FIG. 8 below.

At 418, the document analysis module 136 generates a document record in respect of the document being processed and saves this to the document database 140. The specific fields making up a document record will vary depending on implementation. Table A, however, provides one example of the fields making up a document record in document database 140 and a brief description of the data they store:

TABLE A

Example document record fields

| Field | Brief description |
|---|---|
| Document Type/source CS | Indicates the type of the document (or collaboration system used to generated the document) (for example a wiki document, an issue tracking system ticket, an instant message system dialogue, etc.) |
| Document identifier | The collaboration system's unique identifier for the document |
| Document title | The title of the document, taken from the document metadata or the collaboration system 120 from which the document was accessed. |
| Document location | The location (for example URL) at which the document may be found/accessed. |
| Document creation date | The date on which the document was created or last edited. |
| Document status | This field depends on the type of document in question. For example, where the document relates to an issue tracking ticket, the status field may (for example) take the value of 'open' (indicating the ticket is still open) or 'closed' (indicating the ticket is closed). More generally, the status field may store a value indicating whether a document is current/relevant or not. The status field can be used in downstream document identification/searching/discovery. Continuing the above example, depending on the nature of the search being conducted the system may be configured not to show tickets which have a 'closed' status on the basis that it is no longer of relevance. Where a status value is not relevant to a particular document type (e.g. a wiki page or the like), a default value indicating that the document is relevant (e.g. 'current' or the like) may be stored. |
| Related product(s) | The product(s) to which the content of the document relates (e.g. as determined at 412). This field may enumerate one or more specific products, or provide a single value indicating that the document is general in nature. |
| Document vector | The vector for the document (e.g. as calculated at 408). |
| Tokenized document content | The tokenized document content as determined at 406. This is saved to permit a document summary to be generated (as discussed below). It also allows the model generation process to be repeated without having to re-process all the text. |
| Document weight | A measure of potential document relevance (e.g. as calculated at 410). |
| Document hash | A hash value calculated for the document (e.g. as calculated at 414). |
| Document summary data | Data summarizing the document (or allowing a summary of the document to be generated). For example, an ordered list of sentence identifiers (identifying sentences within the document from most relevant to least relevant (e.g. as generated at 416). |

At 420, the document analysis module 136 determines whether there are any documents that have not yet been processed. If so, processing returns to 404 to select the next unprocessed available document and process it.

If, at 420, all available documents have been processed, processing continues to 422.

At 422, an in-memory database index 142 is created for use by the CIS server application 132. The database index 142 is used to improve processing efficiency in downstream document searching/identification processes.

The document database creation process 400 is then complete.

The document database creation process 400 is periodically repeated in order to capture new and edited documents. The repeat frequency can be selected as desired and/or as appropriate for the level of activity on the collaboration system(s) 120 (for example how often new documents are created and/or existing documents are edited). By way of example, repeating the document database creation process may be repeated every 4 hours.

Document Record Database Generation Example Embodiments

According to an embodiment of the present disclosure, a computer implemented method for generating a document record database comprises: accessing a plurality of documents from one or more remote systems; and for each document: calculating a document vector; calculating a document weighting; determining one or more products to which the document relates; generating a document record including the document vector, document weighting, and one or more products to which the document relates; and saving the document record to the document record database.

Calculating the document weighting for a given document may comprise: accessing linkage data in respect of the given document, the linkage data providing information on occurrences of the given document being linked to by other documents; and calculating the document weighting for the given document based on the linkage data.

Calculating the document weighting for the given document may take into account the number of times the given document has been linked to by other documents, with more recent linkages to the given document being given a greater weight than less recent linkages to the given document.

For each document the method may further comprise: processing the document to identify one or more representative document sentences in respect of the document; generating document summary information based on the one or more representative document sentences identified; and saving the document summary information with the document record.

Prior to generating a document record in respect of a particular document, the method may further comprise determining whether the particular document is a new or edited document, and wherein: in response to determining that the particular document is a new or edited document, the method may comprise generating the document record for the particular document; and in response to determining that the particular document is not a new or edited document, the method may comprise foregoing generation of a document record for the particular document.

Calculating a document vector for a given document may comprise: tokenizing the given document to identify document sentences and document words; processing the tokenized document to generate an initial document vector; and normalizing the initial vector to generate the document vector.

Processing the tokenized document to generate the initial document vector may comprise: retrieving, from a language model, word vectors in respect of each relevant word identified in the document; and summing the retrieved word vectors to generate the initial document vector.

Processing the tokenized document to generate the initial document vector may alternatively comprise: calculating a weighted word vector for each relevant word identified in the document; and summing the weighted word vectors to generate the initial document vector.

Calculating a weighted word vector for a given word may comprise: retrieving, from a language model, a word vector in respect of the given word; retrieving, from a frequency model, a training set frequency in respect of the given word, the training set frequency in respect of the given word being the frequency of the given word in a training set of data; calculating the frequency of the given word in the document; and applying a term frequency-inverse document frequency weighting to the retrieved word vector, the term frequency being the training set frequency in respect of the given word and the document frequency being the frequency of the given word in the document.

Determining one or more products to which a particular document relates may comprise: accessing linkage data in respect of the particular document, the linkage data providing information on occurrences of the particular document being linked to by other documents; and processing the linkage data to infer the one or more product to which the particular document relates.

Related Product Identification

The document database creation process 400 described above involves attempting to identify the product(s) to which a document relates (at 412). Where the product(s) to which a document can be identified, this can be used to improve searching: from both a performance perspective and a results relevance perspective.

For clarity, the product(s) to which a document relates are products that the document has information in respect of and not the system/platform (e.g. collaboration system) used to create or store the document. For example, a document may be created/stored on an issue tracking collaboration system and be (have information) in respect of an entirely different product (e.g. an instant messaging product).

By way of specific example, an organization may set up an instance of an issue tracking system (for example Jira) to track bugs in products released/maintained by the organization. By definition, each ticket (and corresponding document) maintained by this instance relates to a bug and, therefore, one or more products. For example, a user may identify a spelling error in the login screen for a wiki product maintained by the organization (e.g. Confluence cloud) and create a new ticket for that 'bug'. In this case the product to which the ticket (and corresponding document) relates is Confluence cloud. As an alternative example, a user may identify that @ mentions are not working in an instant messaging product (e.g. Stride) or a wiki product (e.g. Confluence server) and create a new ticket. In this case the products to which the ticket (and corresponding document) relate are Stride and Confluence server.

As a further example, documents may also relate more generally to one or more products. For example, a wiki page may be in respect of the usage of one or more products—e.g. a wiki page with content describing how to create rooms in an instant messaging product. Similarly, an instant messaging system dialogue may be troubleshooting a particular configuration of a product—e.g. a conversation on how to properly set up a document management system repository (e.g. a Bitbucket repository) for certain usage.

As can be seen from the above, some documents may have information that relates to multiple different products. In this case the related product field for the document may enumerate those products or take a value such as 'General'. Furthermore, some documents may have information that does not relate to any product, for example a social discussion on an instant messaging platform. In this case the related product field for the document may be empty or take a value such as 'None'.

Figure 5:
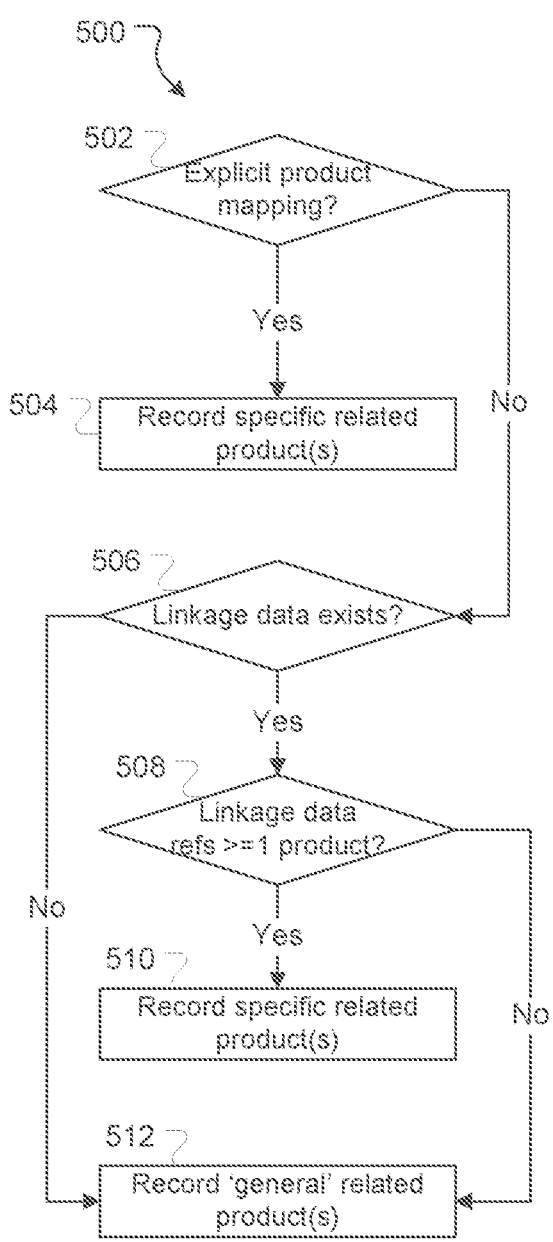
FIG. 5 is a flowchart indicating operations performed to identify products to which a given document relates.

An example related product determination process 500 will be described with reference to FIG. 5. Process 500 is performed in respect of a particular document.

At 502, the document analysis module 136 determines if document provides an explicit product mapping. This may be the case, for example, with an issue tracking system instance set up to track product bugs/issues. Documents in such systems will have an explicit product association—i.e. each ticket is in respect of one or more products that are defined by the ticket creator. Any such product association will typically be provided in/retrievable from document metadata.

If the document provides an explicit product mapping, processing proceeds to 502. If not processing proceeds to 504.

At 502, the document analysis module 136 has determined that the document provides an explicit product mapping. In this case the product(s) associated with the document are retrieved (e.g. from document metadata) to be saved with the document record. In certain embodiments, if there are multiple products a single related product value such as "general" is recorded. In other embodiments, if there are multiple products each different product is recorded in the related product field. Process 500 then ends.

At 506, the document analysis module 136 has determined that the document does not provide an explicit product mapping. In this case, and generally speaking, the document analysis module 136 attempts to infer one or more product(s) to which the document relates. In the present embodiment, inference is made by reference to the document linkage data structure.

At 506, the document analysis module 136 determines whether any linkage data exists in respect of the product. If so, processing proceeds to 508. If not, processing proceeds to 510.

At 508, the document analysis module 136 determines whether the linkage data identifies one or more products. If so, processing proceeds to 510. If not, processing proceeds to 512.

In the present embodiment, determining a document's related products (if any) from linkage data is performed by determining whether any documents which have an explicit product mapping (as described above) link to the document. For example, and as noted above where an issue tracking system instance is set up to track product bugs, the documents (tickets) maintained by that system will typically be in respect of a single product (the product in which the bug has been identified). If such a ticket is explicitly related to product x identifies a knowledge article document (e.g. maintained on a wiki collaboration system), the document analysis module 136 determines that the knowledge article document also relates to product x.

At 510, the document analysis module 136 has determined that linkage data for the document indicates that the document relates to one or more products. In this case the document analysis module 136 assigns a related product value based on the linkage information. Process 500 then ends.

At 512, the document analysis module 136 has determined either that no linkage data exists in respect of the document, or that linkage data exists but does not identify any products. In the present embodiment the document analysis module 136 is configured to assign a related product value indicating the document could relate to all products (e.g. a 'general' value or similar)—this is effectively a conservative approach. In alternative embodiments, the document analysis module 136 is instead configured to assign a related product value indicating that the document relates to no products. Process 500 then ends.

Related Product Identification Example Embodiments

According to an embodiment of the present disclosure, a computer implemented method for associating product information with a particular document comprises: accessing document linkage data, the document linkage data including one or more linkage records, each linkage record providing a linking document identifier and a linked document identifier, the linking document identifier identifying a document which includes a link to the document identified by the linked document identifier; identifying a first relevant linkage record from the linkage data, a relevant linkage record being a linkage record for which the linked document is the particular document; extracting a first linking document identifier from the first relevant linkage record; using the first linking document identifier to access first linking document information in respect of the first linking document; processing the first linking document information to identify a first product that the first linking document relates to; and associating the first product with the particular document, the first product association indicating that the particular document may relate to the first product.

The method may further comprise: identifying a second relevant linkage record from the linkage data, the second relevant linkage record being a different linkage record to the first linkage record; extracting a second linking document identifier from the second relevant linkage record; using the second linking document identifier to access second linking document information in respect of the second linking document; processing the second linking document information to identify a second product that the first linking document relates to; and determining whether the second product is the same as the first product.

In response to determining that the second product is not the same as the first product the method may further comprise: associating a multi-product value with the particular document, the multi product value indicating that the particular document may relate to multiple products.

In response to determining that the second product is not the same as the first product the method may further comprise: associating the second product with the particular document, the second product association indicating that the particular document may also relate to the second product.

The method may further comprise: identifying all relevant linkage records from the linkage data; determining that none of the relevant linkage records is associated with linking document information that identifies a product; and in response to determining that none of the relevant linkage records is associated with linking document information that identifies a product, associating a multi-product value with the particular document, the multi product value indicating that the particular document may relate to multiple products.

The method may further comprise: identifying all relevant linkage records from the linkage data; determining that none of the relevant linkage records is associated with linking document information that identifies a product; and in response to determining that none of the relevant linkage records is associated with linking document information that identifies a product, associating a multi-product value with the particular document, the multi product value indicating that the particular document does not relate to any products.

Relevant linkage records may be records for which the linking document is an issue tracking system document.

The document linkage data may generated by accessing accessible documents and for each accessible document: scraping the accessible document to identify one or more links in the accessible document; and for each link in the accessible document generating a linkage record including an identifier of the accessible document and an identifier of the linked document.

Document Summary Generation

The document database creation process 400 described above involves generating document summary data (at 416). Generation of document summary data is optional. Where generated, however, the document summary data can be used to provide a summary of the document for presentation to a user (e.g. in a document search/discovery/surfacing process).

Figure 8:
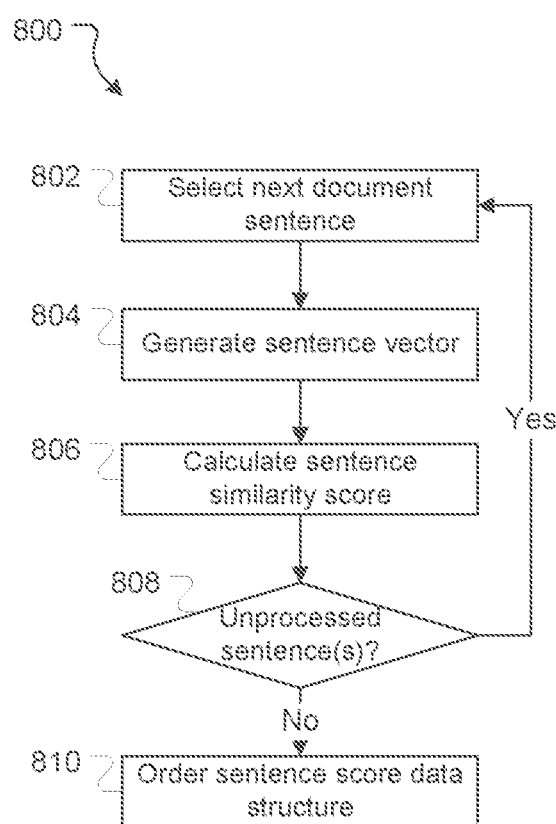
FIG. 8 is a flowchart indicating operations performed to generate document summary data.

One embodiment of a document summary data generation process 800 will be described with reference to FIG. 8. Process 800 will be described in the context of process 400. Process 800 may, however, be performed (or be adapted to be performed) independently in order to provide a document summary for any useful purpose.

Process 800 is performed in respect of a particular document—e.g. in the context of process 400, the document selected at 404.

At 802, the language training module 134 selects the next sentence in the document. Where process 802 is performed in the context of process 400, document sentences have already been identified at 406. If sentences have not already been identified this can be done by a tokenization process similar to (or the same as) 406 described above.

At 804, the language training module 134 generates a sentence vector in respect of the selected sentence. A sentence vector is generated in a similar fashion to the generation of a document vector as described with respect to 408. Each word in the sentence is identified, the corresponding word vector is retrieved from the language model, and the sum of the vectors for all words in the sentence is calculated. As with calculation of the document vector, a weighting may be applied to the sentence vector (e.g. a TF-IDF weighting), and the sentence vector (weighted or otherwise) may be normalized.

At 806, the document analysis module 136 calculates a sentence similarity score for the sentence. The sentence similarity score is a value indicating how similar or otherwise the sentence is to the document in which the sentence appears.

More specifically, a given sentence's similarity score is based on the similarity of the sentence's vector to the document vector of the document in which the sentence appears (for example as calculated at 408). This similarity may be calculated in various ways. For example, the cosine distance (computationally expensive) or Euclidean distance (computationally simpler) may be used by invoking optimized routines from appropriate math libraries. In embodiments where the document and sentence vectors are normalized, the cosine distance and Euclidian methods are equivalent so the faster Euclidean distance method is used.

In the present embodiment, sentence scores are stored in a sentence score data structure. Any appropriate data structure may be used, for example a data structure in which each record stores a document identifier identifying the document in which the sentence appears, a sentence identifier identifying a particular sentence in the document, and a sentence score storing the sentence score for that sentence. The sentence vector generated at 806 (which may be an unweighted sentence vector, a weighted sentence vector, a normalized unweighted sentence vector, or a normalized weighted sentence vector) may also be saved in the sentence score data structure so if it is needed in downstream operations it does not need to be recalculated.

At 808, the language training module 134 determines whether any sentences in the document have not yet had sentence vectors calculated. If further sentences requiring sentence vector calculation exist, processing returns to 802 to select the next unprocessed sentence in the document.

If, at 808, sentence vectors have been calculated for all sentences in the document, processing proceeds to 810.

At 810, and in the present embodiment, the language training module 134 orders the sentence score data structure by sentence score (e.g. from most similar to least similar). In alternative embodiments, ordering by sentence score can be performed as part of another process.

In the context of process 400, and in certain embodiments, the document summary data generation process 800 is complete at 810 (with the ordered sentence score data having been generated for saving to the document record).

In certain embodiments, when a sentence summary is displayed it is limited to n sentences. The number of sentences n may be predefined at the time the summary is generated, in which case only a predetermined number of records from the sentence score data structure are maintained (e.g. the records with top n sentence scores).

Alternatively, the number of sentences n may be passed as a parameter from another program (e.g. a client application 112) requesting a document summary to be provided. In this case n may be selected as is appropriate to the context—for example where the request is from a device operating to display a document summary to a user, n may be calculated based on the available user interface display area and/or number of summaries that are to be displayed. In this case, the entire the sentence score data structure may be maintained once it is generated, however only predefined numbers of records may be used by/served to a given requesting process.

Where a document summary is generated based on n most relevant sentences, the n records with the top sentence similarity scores are selected from the sentence score data structure. The original sentences corresponding to those n records are then retrieved (based, for example, on sentence identifier) to be returned (and, for example, displayed to an end user). In certain embodiments, before being returned to the requesting process—or, at least, before being displayed to the end user—the n sentences are re-ordered to be displayed/presented in the order in which they appeared in the original document. Notably, reordering as to original document order may result in a sentence having a lower similarity score being returned/presented to a user before a sentence with a higher similarity score.

In certain embodiments the generation of sentence vectors and calculation of sentence similarity scores is parallelized to allow multiple sentences to be processed at the same time.

Document Summary Generation Example Embodiments

According to an embodiment of the present disclosure, a computer implemented method comprises: accessing a document; generating a document vector in respect of the document; generating a sentence vector for each sentence in the document; calculating a sentence similarity score for each sentence in the document, the sentence similarity for a given sentence being calculated based on a similarity between the sentence vector for the given sentence and the document vector; identifying one or more representative document sentences for inclusion in a document summary, the one or more representative document sentences being identified based on their sentence similarity scores.

The method may further comprise generating a summary order in which the representative document sentences identified for inclusion in the summary should be presented, wherein the summary order is based on the order in which the identified sentences appear in the document.

Generating a sentence vector in respect of a given sentence may comprise: identifying relevant words in the given sentence; retrieving, from a language model, word vectors in respect of each relevant word identified in the given sentence; and summing the retrieved word vectors to generate the sentence vector.

Generating a sentence vector in respect of a given sentence may alternatively comprise: identifying relevant words in the given sentence; calculating a weighted word vector for each word identified in the given sentence; and summing the weighted word vectors to generate the sentence vector.

Calculating a weighted word vector for a given word may comprise: retrieving, from a language model, a word vector in respect of the given word; applying a term frequency-inverse document frequency weighting to the retrieved word vector.

Prior to generating a sentence vector for each sentence in the document, the document may be tokenized to identify the sentences in the document.

Generating a document vector in respect of the document may comprise: accessing the document; tokenizing the document to identify document sentences and document words; processing the tokenized document to generate an initial document vector; and normalizing the initial vector to generate the document vector.

Processing the tokenized document to generate the initial document vector may comprise: retrieving, from a language model, word vectors in respect of each relevant word identified in the document; and summing the retrieved word vectors to generate the initial document vector.

Processing the tokenized document to generate the initial document vector may alternatively comprise: calculating a weighted word vector for each relevant word identified in the document; and summing the weighted word vectors to generate the initial document vector.

Calculating a weighted word vector for a given word may comprise: retrieving, from a language model, a word vector in respect of the given word; retrieving, from a frequency model, a training set frequency in respect of the given word, the training set frequency in respect of the given word being the frequency of the given word in a training set of data; calculating the frequency of the given word in the document; and applying a term frequency-inverse document frequency weighting to the retrieved word vector, the term frequency being the training set frequency in respect of the given word and the document frequency being the frequency of the given word in the document.

Document Identification

Figure 6:
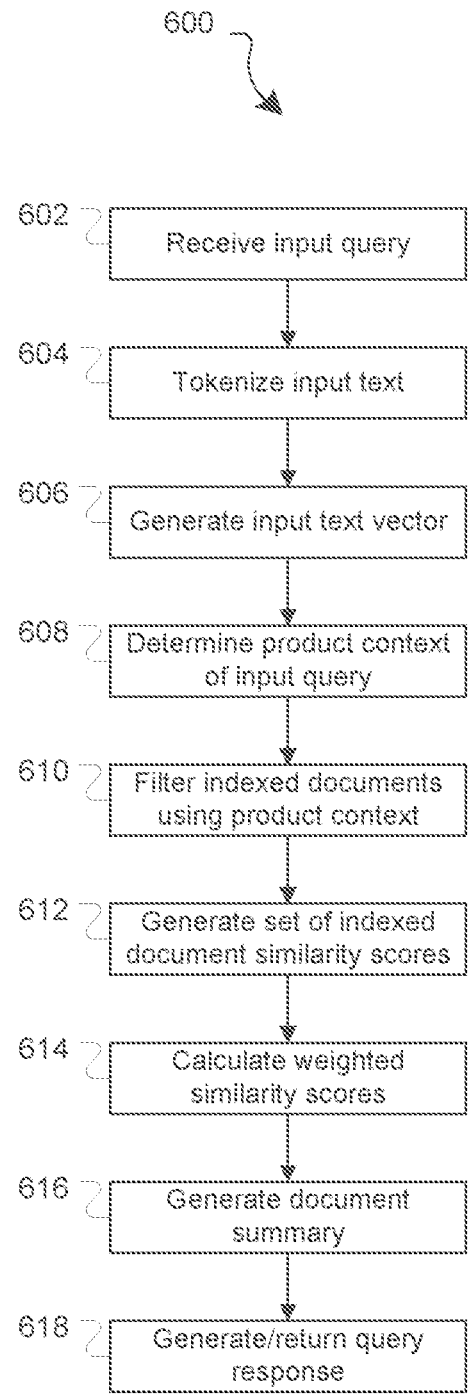
FIG. 6 is a flowchart indicating operations performed to identify documents related to an input query.

Turning to FIG. 6, this section describes a document identification process 600 which is performed to identify documents of potential relevance to an input query.

In the present embodiment, the operations of the document identification process 600 are performed by the document analysis module 136 of the CIS 130. The operations could, however, be performed by alternative components of the CIS 130 (e.g. the CIS application server 132).

At 602, the document analysis module 136 receives an input query. The input query includes input text—i.e. one or more words. The input text may be a document (as described above) or arbitrary text in any appropriate format. In certain embodiments the input query may include additional information, for example a product to which the query relates. The additional information may be provided as metadata to the document/text, as a parameter of the input query, or in any other appropriate manner.

The document identification process 600 may be invoked in various contexts. The invocation context will determine where the input query is received from and where the response is returned. Typically, however, the input query will be received from either a user device 110 (as configured by a client application 112) or a collaboration system 120 (as configured by a server application 122).

As one example, one invocation context for document identification process 600 is that of a user specifically (manually) searching for documents relating to a particular subject. In this case, the user will input text in respect of the subject into an appropriate user interface (e.g. a search interface provided by a client application 112), and the text will be communicated by the user device 110 to the CIS 130 as the input text. Depending on implementation/configuration, communication to the CIS 130 may be directly to the document analysis module 136, or to the CIS server application 132 which then passes the input query to the document analysis module 136. In this case, the query response returned at 618 is used by the client application 112 to generate/populate a response interface in which links to identified documents are displayed to the user.

As a further example, another invocation context for document identification process 600 is that of a collaboration system 120 that is configured such that when a user submits (or indicates an intention to submit) a document, the collaboration system 120 automatically operates to identify similar documents and return these to the user for consideration. A specific example of this invocation context with respect to an issue tracking system is described below.

The specific format and data included in the input query will vary depending on implementation. By way of specific example, however, Table B below provides an example schema format for input queries to be communicated to the CIS 130:

TABLE B

Example input query API

```
{
    "include": [
        "CollaborationSystem1",
        "CollaborationSytem2",
        {
            "limit": 2,
            "type": "CollaborationSystem3"
```

TABLE B-continued

Example input query API

```
        }
      ],
      "product": [
        "cloud_confluence"
      ],
      "text": "collaborative editing isn't working"
}
```

The example input query of Table B, three collaborations systems are to be queried (systems 1, 2, and 3, with a maximum of 2 documents maintained by collaboration system 3 to be returned ("limit":2)), only documents relating to the "cloud_confluence" product are to be considered. and the input text being processed is "collaborative editing isn't working".

At 604, the document analysis module 136 tokenizes the input text received in the input query. Tokenization of the input text is similar to (or the same as) operation 406 described above.

At 606, the document analysis module 136 generates a vector in respect of the tokenized input text. Vector calculation is similar to (or the same as) operation 408 described above. If document vectors are weighted and/or normalized at 408 above, so too is the vector generated in respect of the tokenized input text.

At 608, the document analysis module 136 determines whether a product context is associated with the input query and, if so, what that product context is. A product context indicates one or more particular products that a query is in respect of, and may be identified in various ways.

For example, where the invocation context is a user manually searching for documents relating to a particular subject, the user interface provided by the client application 112 (into which the user enters the input text) may provide a product selection mechanism—e.g. a checkbox, drop-down list, or other user interface allowing the user to select a particular product that the query is in respect of. Similarly, where the invocation context is a user submitting a new ticket in an issue tracking system, the ticket creation interface provided by the issue tracking system client application 112 may include a field that the user populates with the product to which the ticket relates. In both of these cases, the related product is communicated to the CIS 130 along with the input query (e.g. as a query parameter) and extracted/referenced at 608.

At 610, the document analysis module 136 filters the document database 140 based on the product context identified at 608 (and the related product(s) field of each indexed document). This results in a subset of document records from the document database 140, all of which have either a related product that matches a product from the input enquiry product context or has a related product value such as 'general' indicating the document record relates to multiple products.

Where no product context is identified at 608, filtering step at 610 is omitted. In this case the subset of indexed documents is the entire set of document records in the document database 140.

At 612, the document analysis module 136 generates a set of indexed document similarity scores. This involves calculating a similarity score for each indexed document record in the subset of indexed documents generated at 610. A similarity score for a given document record is a value indicating how similar or otherwise a document is to the input query based on the document record vector (stored in the document database 140) and the input text vector (calculated at 606). For example, in certain embodiments similarity scores are floating point numbers between 0 and 1, with higher numbers indicating greater similarity.

Document similarity scores may be calculated in various ways. For example, the cosine distance (computationally expensive) or Euclidian distance (computationally simpler) may be used by use of optimized routines in appropriate math libraries. In embodiments where the document vector is normalized, the cosine distance and Euclidian methods are equivalent so the faster, Euclidean distance method is used.

In certain embodiments, the calculation similarity scores is parallelized so that similarity scores for many indexed document records are calculated at the same time. This allows thousands of similarity scores to be calculated in a few milliseconds. The in-memory database index 142 is designed to support this parallelization. The similarity score calculation can also be GPU accelerated.

The set of similarity scores (i.e. the similarity scores for each document in the document database 140) is stored (at least temporarily) in table or similar structure in which each document's identifier is associated with its corresponding similarity score.

At 614, the document analysis module 136 uses the proximity scores calculated at 612 and the document weights (as associated with each document record) to calculate weighted similarity scores. In the present embodiment, this involves calculating a weighted average of the similarity score and document weight, with the majority of the weight (e.g. 75%) going to the similarity score, and the remainder (e.g. 25%) going to the document weighting.

At 616, the document analysis module 136 generates summaries for the n documents that are to be returned—i.e. the n documents with the highest weighted similarity scores. The number of documents that are to be returned may be predefined by the document analysis module 136, or may be a parameter received as part of the input query (i.e. a query specifying that at most n documents should be returned).

In order to generate a summary for a given document, the document analysis module 136 accesses the document summary data from the document record to retrieve identifiers for the m sentences in the document with the highest sentence similarity score. The number of sentences that are to be used to in the document summary may be predefined by the document analysis module 136, or may be a parameter received as part of the input query (i.e. a query specifying that summaries should be m sentences long). The original text of the m sentences is then retrieved, and the sentences re-ordered in their original order (i.e. the order as they appear in the document, which may well be different to the sentence similarity score based order).

At 618, the document analysis module 136 generates and returns a query response. The response is typically returned/communicated to the system from which the input query was received.

The response includes zero or more response items. Each response item is in respect of (and corresponds to) a document record maintained in the document database 140 and includes data from (or derived from) the document record. For example, each response item includes at least a document identifier that allows the indexed document to be identified and accessed—for example the indexed document's location/URL. Each response item may include other information in respect of the indexed document (for example, the document title and/or other fields from document database 140) and/or the similarity score for the document (as generated at 612). Each response item may further include a summary of the document to which the response item relates (as generated at 616). Typically, items in the response are ordered from most relevant to least relevant (based on similarity scores)—however if similarity scores are included in the response such ordering may be performed by the system to which the response is communicated.

The specific format and data included in the query response will vary depending on implementation. By way of specific example, however, Table C below provides an example response package format that can be communicated by the CIS 130 to the relevant receiving system:

TABLE C

Example response package

```
{
    "results": [
        {
            "key": <document identifier>,
            "similarity": <similarity score>,
            "summary": "<document summary>",
            "title": "<document title>",
            "type": "<document type/source collaboration system>",
            "url": " <URL>"
        },
        ...
        {
            ...
        },
    ],
    "scale":1000
}
```

In certain implementations, the document analysis module 136 is configured to include response items for all of the indexed document records.

In other implementations, the document analysis module 136 is configured to return a predetermined number of documents (i.e. n documents). In this case, the document analysis module 136 identifies the n documents with the highest similarity scores and generates a response package that includes items in respect of those n documents. The predetermined number of documents n may be selected as appropriate for the implementation and invocation context. By way of example, in certain cases a value of 5 or 10 may appropriate for n, while in others a smaller or greater value of n may be appropriate. The predetermined number of documents may also be defined by the system from which the query is received (for example as a query parameter).

In still further implementations, the analysis module 136 is configured only to return indexed documents that have a similarity score exceeding a predetermined similarity threshold. For example, if no indexed documents have a similarity score greater than the similarity threshold no documents are returned (on the basis that no documents are sufficiently similar to warrant returning/further consideration). If only m indexed documents have a similarity score greater than the similarity threshold, then only m indexed documents are returned. Where a threshold similarity is implemented together with returning a predetermined number of documents, only m documents are returned even if m is less than the predetermined number of documents (n).

Different similarity thresholds may be appropriate depending on the document identification invocation context. In other cases, no similarity threshold is set, so the top n documents are returned regardless of their similarity scores.

The manner in which the response package is used by the receiving system will depend on the invocation context. Typically, however, the client application 112 will receive the response and use it to generate/populate a response interface. The response interface will display links to some or all of the documents indicated in the response (or a message stating no documents were identified), typically together with at least the title of the document. The user can then select the document links to view the actual documents.

As can be seen, operations 608 and 610 described above take advantage of input query product context and product information associated with document records in the document database 140. This can improve the efficiency of the document identification process 600, in that similarity scores may (depending on the input query product context) only need to be calculated for a subset of indexed document records and not all the indexed document records. It can also improve the relevance of the results, in that there is less likelihood that a non-relevant indexed document record will have a high similarity score and be returned to the user despite its lack of relevance. In certain implementations, however, operations 608 and 610 are omitted. This may be because there is no desire to cull the indexed document records based on product or there is no ability to do so (i.e. if no related product details are stored in respect of the indexed documents). In this case, steps 608 and 610 are omitted and indexed document similarity scores are calculated for all indexed document records.

Detection of Duplicate Issue Tracking Tickets

Figure 7:
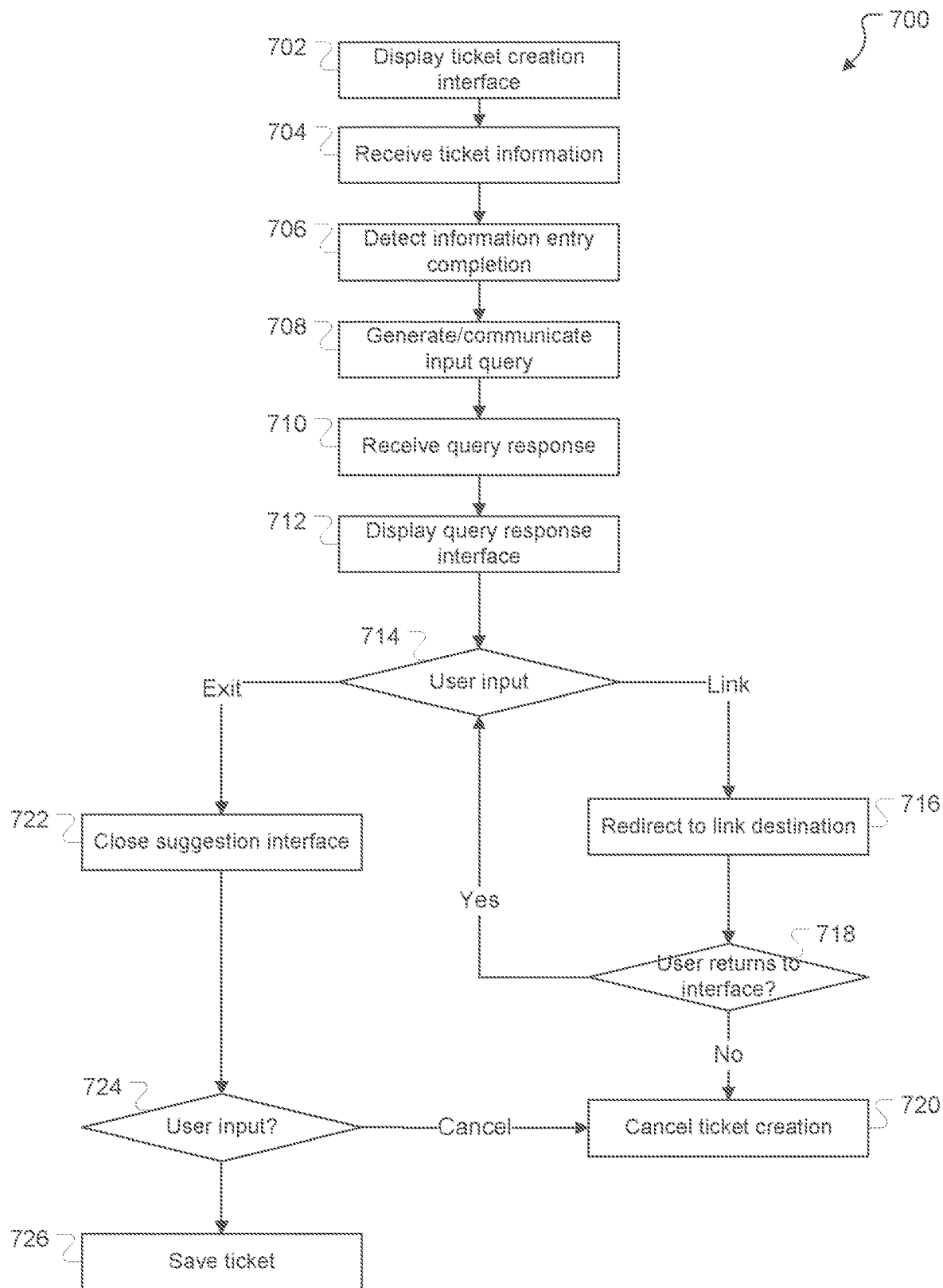
FIG. 7 is a flowchart indicating operations performed to identify documents related to a new ticket being considered for creation in an issue tracking system.

This section provides an example invocation context for document identification process 600. The example will be described with reference to process 700 of FIG. 7.

In this embodiment, the collaboration system 120 is an issue tracking collaboration system (with an issue tracking collaboration system server 122) and the user device client application 112 configures the user device 110 to provide client side issue tracking system functionality.

At 702, user device 110 (as configured by client application 112) displays a ticket creation interface. The ticket creation interface includes various input fields/controls which are used to define information in respect of a new ticket that the user is considering submitting to the issue tracking collaboration system 120.

At 704, the user device 110 receives user input defining ticket information—for example a ticket description, a related product, and/or any other ticket information.

At 706, the user device 110 detects completion of the user input. This may, for example, be by the user activating a particular user interface control—for example a 'submit' control or the like.

At 708, the user ticket information input at 704 is used to generate an input query, and the input query is communicated to the CIS 130. This may be performed in various ways. For example, the client application 112 may be configured to generate the input query itself and communicate the input query directly to the CIS 130. Alternatively, the client application 112 may be configured to communicate the ticket information to the issue tracking collaboration system 130 (or the server application 132 operating thereon), and the issue tracking collaboration system 130 configured to generate the input query and communicate it to the CIS 130. The input query may include various information, for example the text of the ticket, the title, the product(s) to which the issue relates, etc.

The query is received and processed by the CIS 130, for example as described in process 600 above.

At 710, the user device receives 110 a query response. This may be received directly from the CIS 130 or be received via the issue tracking collaboration system 120.

At 712, the user device 110 displays a query response interface. If no items are included in the query response, a message indicating that no documents were identified is displayed. Where the query response includes one or more response items, the query response interface is generated to display records in respect of some (or all) of those items. Each displayed record is in respect of a corresponding response item and document. Various data may be displayed, for example the document title, the document summary, the type/source CS system for the document, and the document link (which, when activated by the user, redirects to the actual document).

In certain embodiments the query response interface is a pop-up interface displayed in addition to (e.g. atop or beside) the ticket information entry interface.

At 714, the user device 110 detects a user input in the query response interface. In this particular example, the user input is either an 'exit' input (e.g. activation of an exit control such as control) or a link selection input (e.g. activation of a displayed document link). If the user action is a link selection input, processing proceeds to 716. If the user action is an exit action, processing proceeds to 722.

At 716, the user device 110 has detected user selection of a document link. In this case the user device 110 redirects the user to the destination indicated by the selected link in order to display the linked document. The precise redirection will depend on the destination of the link, which may be a document (e.g. another issue) maintained by the issue tracking collaboration system, or may be a document maintained by another collaboration system (in which case the redirection may cause the linked document to be displayed an alternative client application—e.g. a web browser or other client application).

At 718, the user device 110 detects whether the user has returned to the query response interface. If so, processing returns to 714 where the user may select another document link to view an alternative document or choose to exit the query response interface.

If the user device 110 does not detect that the user has returned to the query response interface within a time-out period, processing proceeds to 720. In this case the user device 110 determines that the user has abandoned creation of the ticket (e.g. because they identified an existing ticket or other document negating the need for such ticket creation). At 720 the user device 110 cancels the ticket creation process without creating a new ticket. This may involve the user device 110 generating and communicating a cancellation message to the issue tracking collaboration system 120.

If, at 714, an 'exit' user input is received, processing proceeds to 722. At 722, the user device closes the query response interface.

At 724, the user device 110 detects further input in the ticket creation interface. In this particular example, the further user input is either a 'create ticket' input or a 'cancel ticket creation' interface (both inputs provided by appropriate user interface controls). If the user input is to cancel the ticket creation, processing proceeds to 720.

If, at 724, the user input is to create the ticket, processing proceeds to 726. At 726 the ticket is saved as per normal issue tracking system operations—for example by communicating the new ticket information/create ticket command to the issue tracking system server 130.

As can be seen, if a linked document is of sufficient relevance a user can abandon creation of a ticket that is not needed. This will typically occur if the linked document is an existing ticket in respect of the same (or a sufficiently similar) issue to that which the user is considering creating a ticket for, in which case a duplicate ticket need not be created. It may also occur if the linked document allows the user to fix their issue themselves (or directs the user to a more appropriate forum to raise the issue)—for example if the linked document is a web page of instant message dialogue with content that allowing the user to resolve their own query.

In some implementations the document database 140 may include sensitive data from multiple different users. This could be the case, for example, where documents from an issue tracking system that is used by an organization's support team (and which customers submit tickets to) are maintained by the CIS 130. In this case, search processes such as 600 and 700 that have the ability to return such documents may need to be limited for use by the organization's internal support team to ensure that one customer's ticket data does not get returned to another customer.

In other cases, however, the documents maintained by the CIS 130 may all be public documents—for example generated in a public wiki, a public chat forum etc. In this case there may be no concerns re displaying a document created by one user with another user.

Document Identification Example Embodiments

According to an embodiment of the present disclosure, a computer implemented method for identifying one or more documents of potential relevance to an input query comprises: receiving the input query, the input query including input text; processing the input text to generate an input query vector; accessing document records from a record database, each document record including a document vector; generating a document similarity score in respect of each accessed document, the document similarity score for a given document record being generated using the document vector for the given document record and the input query vector, the document similarity score for a given document record indicating the similarity of the input text to a document that the given document record is in respect of; identifying one or more potentially relevant document records based on their document similarity scores.

The method may further comprise: processing the input query to identify one or more products, and accessing document records from a record database may comprise accessing only document records associated with at least one of the one or more products identified.

Each document record may further include a document weight, and the method may further comprise generating a weighted document similarity score in respect of each accessed document, the weighted document similarity score for a given document record being generated based on the document vector for the given document record, the document weight for the given document record, and the input query vector; and the one or more potentially relevant document records may be identified based on their weighted document similarity scores.

Processing the input text to generate an input query vector may comprise: tokenizing the input text to identify input text sentences and input text document words; processing the tokenized input text to generate an initial input text vector; and normalizing the initial input text vector to generate the input query vector.

Processing the tokenized input text to generate the initial input text vector may comprise: retrieving, from a language model, word vectors in respect of each relevant word identified in the input text; and summing the retrieved input text vectors to generate the initial input text vector.

Processing the tokenized input text to generate the initial input text vector may alternatively comprise: calculating a weighted word vector for each relevant word identified in the input text; and summing the weighted word vectors to generate the initial input text vector.

Calculating a weighted word vector for a given word may comprise: retrieving, from a language model, a word vector in respect of the given word; retrieving, from a frequency model, a training set frequency in respect of the given word, the training set frequency in respect of the given word being the frequency of the given word in a training set of data; calculating the frequency of the given word in the initial text; and applying a term frequency-inverse input text frequency weighting to the retrieved word vector, the term frequency being the training set frequency in respect of the given word and the input text frequency being the frequency of the given word in the input text.

The input query may be received from an issue tracking system and the method may further comprise: retrieving documents associated with the one or more potentially relevant document records identified; and communicating the documents to the issue tracking system.

The input query may be received from an issue tracking system and the method may further comprise: retrieving document links associated with the one or more potentially relevant document records identified, a document link in respect of a given document record providing access to a document associated with the given document record; and communicating the document links to the issue tracking system.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method comprising:
accessing a document;
generating a document vector in respect of the document;
generating a sentence vector for each sentence in the document;
calculating a sentence similarity score for each sentence in the document, the sentence similarity for a given sentence being calculated based on a similarity between the sentence vector for the given sentence and the document vector;
identifying one or more representative document sentences for inclusion in a document summary, the one or more representative document sentences being identified based on their sentence similarity scores.

2. The computer implemented method of claim 1, further comprising:
generating a summary order in which the representative document sentences identified for inclusion in the summary should be presented, wherein the summary order is based on the order in which the identified sentences appear in the document.

3. The computer implemented method of claim 1, wherein generating a sentence vector in respect of a given sentence comprises:
identifying relevant words in the given sentence;
retrieving, from a language model, word vectors in respect of each relevant word identified in the given sentence; and
summing the retrieved word vectors to generate the sentence vector.

4. The computer implemented method of claim 1, wherein generating a sentence vector in respect of a given sentence comprises:
identifying relevant words in the given sentence;
calculating a weighted word vector for each word identified in the given sentence; and
summing the weighted word vectors to generate the sentence vector.

5. The computer implemented method of claim 4, wherein calculating a weighted word vector for a given word comprises:
retrieving, from a language model, a word vector in respect of the given word;
applying a term frequency-inverse document frequency weighting to the retrieved word vector.

6. The computer implemented method of claim 1, wherein prior to generating a sentence vector for each sentence in the document, the document is tokenized to identify the sentences in the document.

7. The computer implemented method of claim 1, wherein generating a document vector in respect of the document comprises:
accessing the document;
tokenizing the document to identify document sentences and document words;
processing the tokenized document to generate an initial document vector; and
normalizing the initial vector to generate the document vector.

8. The computer implemented method of claim 7, wherein processing the tokenized document to generate the initial document vector comprises:
retrieving, from a language model, word vectors in respect of each relevant word identified in the document; and
summing the retrieved word vectors to generate the initial document vector.

9. The computer implemented method of claim 7, wherein processing the tokenized document to generate the initial document vector comprises:
calculating a weighted word vector for each relevant word identified in the document; and
summing the weighted word vectors to generate the initial document vector.

10. The computer implemented method of claim 9, wherein calculating a weighted word vector for a given word comprises:
retrieving, from a language model, a word vector in respect of the given word;
retrieving, from a frequency model, a training set frequency in respect of the given word, the training set frequency in respect of the given word being the frequency of the given word in a training set of data;
calculating the frequency of the given word in the document; and
applying a term frequency-inverse document frequency weighting to the retrieved word vector, the term frequency being the training set frequency in respect of the given word and the document frequency being the frequency of the given word in the document.

11. A computer system comprising:
a processor;
a communication interface; and
a non-transitory computer-readable storage medium storing sequences of instructions, which when executed by the processor, cause the processor to implement a method comprising:
accessing a document;
generating a document vector in respect of the document;
generating a sentence vector for each sentence in the document;
calculating a sentence similarity score for each sentence in the document, the sentence similarity for a given sentence being calculated based on a similarity between the sentence vector for the given sentence and the document vector;
identifying one or more representative document sentences for inclusion in the summary, the one or more representative document sentences being identified based on their sentence similarity scores.

12. The computer system of claim 11, wherein the sequences of instructions further cause the processor to implement the method further comprises:
generating a summary order in which the representative document sentences identified for inclusion in the summary should be presented, wherein the summary order is based on the order in which the identified sentences appear in the document.

13. The computer system of claim 11, wherein generating a sentence vector in respect of a given sentence comprises:
identifying relevant words in the given sentence;
retrieving, from a language model, word vectors in respect of each relevant word identified in the given sentence; and
summing the retrieved word vectors to generate the sentence vector.

14. The computer system of claim 11, wherein generating a sentence vector in respect of a given sentence comprises:
identifying relevant words in the given sentence;
calculating a weighted word vector for each word identified in the given sentence; and
summing the weighted word vectors to generate the sentence vector.

15. The computer system of claim 14, wherein calculating a weighted word vector for a given word comprises:
retrieving, from a language model, a word vector in respect of the given word;
applying a term frequency-inverse document frequency weighting to the retrieved word vector.

16. The computer system of claim 11, wherein prior to generating a sentence vector for each sentence in the document, the document is tokenized to identify the sentences in the document.

17. The computer system of claim 11, wherein generating a document vector in respect of the document comprises:
accessing the document;
tokenizing the document to identify document sentences and document words;
processing the tokenized document to generate an initial document vector; and
normalizing the initial vector to generate the document vector.

18. The computer system of claim 17, wherein processing the tokenized document to generate the initial document vector comprises:
retrieving, from a language model, word vectors in respect of each relevant word identified in the document; and
summing the retrieved word vectors to generate the initial document vector.

19. The computer system of claim 17, wherein processing the tokenized document to generate the initial document vector comprises:
calculating a weighted word vector for each relevant word identified in the document; and
summing the weighted word vectors to generate the initial document vector.

20. The computer system of claim 19, wherein calculating a weighted word vector for a given word comprises:
retrieving, from a language model, a word vector in respect of the given word;
retrieving, from a frequency model, a training set frequency in respect of the given word, the training set frequency in respect of the given word being the frequency of the given word in a training set of data;
calculating the frequency of the given word in the document; and
applying a term frequency-inverse document frequency weighting to the retrieved word vector, the term frequency being the training set frequency in respect of the given word and the document frequency being the frequency of the given word in the document.

* * * * *